(12) United States Patent
Li et al.

(10) Patent No.: US 12,019,989 B2
(45) Date of Patent: Jun. 25, 2024

(54) OPEN DOMAIN DIALOG REPLY METHOD AND SYSTEM BASED ON THEMATIC ENHANCEMENT

(71) Applicant: ZHEJIANG LAB, Hangzhou (CN)

(72) Inventors: Taihao Li, Hangzhou (CN); Jiantao Huang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/297,610

(22) Filed: Apr. 8, 2023

(65) Prior Publication Data

US 2024/0062006 A1 Feb. 22, 2024

Related U.S. Application Data

(63) Continuation of application No. PCT/CN2022/139320, filed on Dec. 15, 2022.

(30) Foreign Application Priority Data

Aug. 16, 2022 (CN) .......................... 202210981384.4

(51) Int. Cl.
  *G06F 40/20* (2020.01)
  *G06F 40/268* (2020.01)
  *G06F 40/284* (2020.01)
  *G06F 40/30* (2020.01)
  *G06N 3/08* (2023.01)
  *G06N 20/00* (2019.01)

(52) U.S. Cl.
  CPC .......... *G06F 40/284* (2020.01); *G06F 40/268* (2020.01); *G06F 40/30* (2020.01); *G06N 3/08* (2013.01); *G06N 20/00* (2019.01)

(58) Field of Classification Search
  CPC ................................ G06F 40/20; G06F 40/30
  See application file for complete search history.

(56) References Cited

U.S. PATENT DOCUMENTS

| | | | |
|---|---|---|---|
| 2020/0004792 A1* | 1/2020 | Chang | G06F 40/30 |
| 2022/0300708 A1* | 9/2022 | Cao | G06F 40/169 |
| 2022/0318505 A1* | 10/2022 | Pouran Ben Veyseh | G06F 40/126 |

OTHER PUBLICATIONS

Liu, Yinhan, et al. "Roberta: A robustly optimized bert pretraining approach." arXiv preprint arXiv:1907.11692 (2019). (Year: 2019).*

(Continued)

*Primary Examiner* — Jialong He

(57) ABSTRACT

An open domain dialog reply method and a system based on thematic enhancement are provided. The method includes: collecting and pre-processing text corpuses to obtain Chinese dialog corpus dataset, performing sentence breaking, word separation, and lexical annotation of dialogs and extracting noun words, performing enhancement of semantic and thematic information on each sentence, and learning vector representations of original sentences and enhanced sentences by a pre-trained sentence representation model, performing thematic aggregation enhancement by a graph convolutional neural network, and inputting the sentence vector after the thematic aggregation enhancement into a pre-trained generative model, generating a candidate set of dialog replies, and training a reply ranking selection model with a contrast learning manner to select the most suitable reply.

8 Claims, 3 Drawing Sheets

(56) References Cited

OTHER PUBLICATIONS

Wu, Qing, et al. "A Film and TV News Digest Generation method Based on HanLP." 2020 IEEE Intl Conf on Parallel & Distributed Processing with Applications, Big Data & Cloud Computing, Sustainable Computing & Communications, Social Computing & Networking (ISPA/BDCloud/SocialCom/SustainCom). IEEE, 2020. (Year: 2020).*
Zhang, Zhuosheng, et al. "Semantics-aware BERT for language understanding." Proceedings of the AAAI Conference on Artificial Intelligence. vol. 34. No. 05. 2020 (Year: 2020).*
Guo Xiaozhe, et al, 'GRS: A generative retrieval dialogue model for intelligent customer service in the field of e-commerce', Journal of East China Normal University (Natural Science), Sep. 2020, pp. 156-166.
China Office Action of 202210981384.4.

* cited by examiner

OPEN DOMAIN DIALOG REPLY METHOD AND SYSTEM BASED ON THEMATIC ENHANCEMENT

CROSS-REFERENCE TO RELATED APPLICATIONS

This application is a continuation of international patent application No. PCT/CN2022/139320, filed on Dec. 15, 2022, which itself claims priority to Chinese patent application No. 202210981384.4, filed on Aug. 16, 2022. The contents of the above identified applications are hereby incorporated herein in their entireties by reference.

TECHNICAL FIELD

The present disclosure relates to the field of artificial intelligence, and in particular, to an open domain dialog reply method and a system based on thematic enhancement.

BACKGROUND

Generation of open domain dialog replies is a challenging task in a natural language processing, and the open domain dialog refers to a general chat in an unrestricted domain. At present, artificial intelligence has made a major breakthrough in task-based dialog reply tasks, however, in a dialog reply of an open domain, it is impossible to control intention changes of a user, so that a model applied in the dialog reply of an open domain needs to have stronger generalization ability and robustness.

At present, a system for generation of dialog replies typically includes two modes. One mode of the system is to find a reply of similar content in a specific database or corpus based on a retrieval model, which is now applied in many knowledge-based quizzes or task-based dialogs. However, in an open domain chat, no specific corpus can be referred to, so this mode is often not as effective as expected. With a rise of deep learning, especially a proposal of pre-trained generative models in a large scale such as GPT (Generative Pre-trained Transformer), T5 (Text-to-Text Transfer Transformer), BART (Bidirectional and Auto-Regressive Transformers), and the like, generative dialog systems based on the deep learning have also received more and more attention. Although semantically smooth replies can be generated by a method of pre-training in a large-scale dialog corpus and then fine-tuning thereon, general replies are often generated in the open domain chat, lacking thematic consistency.

In the related art, coherence of the replies and a previous text is only considered in an open domain dialog reply, but the consistency between themes is ignored, so that the model generally gives general replies. Moreover, since no fixed theme exits in the open domain, it is difficult for the model to detect the theme in time and give a consistent reply.

SUMMARY

According to various embodiments of the present disclosure, the present disclosure provides an open domain dialog reply method and a system based on thematic enhancement.

An open domain dialog reply method based on thematic enhancement includes: collecting and pre-processing text corpuses of Chinese open domain dialog which are open-source, to obtain Chinese dialog corpus dataset;
  performing sentence breaking, word separation, and lexical annotation of dialogs by a public natural language processing toolkit Han Language Processing ("HanLP"), and extracting noun words by a regular expression;
  performing enhancement of semantic and thematic information on each sentence, and learning vector representations of original sentences and enhanced sentences by a pre-trained sentence representation model;
  extracting semantic and thematic information of sentences by a graph convolutional neural network, and performing thematic aggregation enhancement to obtain a sentence vector after the thematic aggregation enhancement; and
  inputting the sentence vector after the thematic aggregation enhancement into a pre-trained generative model GPT, generating a candidate set of dialog replies by a decoding strategy of beam search, and finally training a reply ranking selection model with a contrast learning manner to select the most suitable reply.

In some embodiments, the collecting and pre-processing text corpuses of Chinese open domain dialog which is open-source, to obtain Chinese dialog corpus dataset further includes: collecting the text corpuses of Chinese open domain dialog which are open-source by means of a web crawler, and performing data filtering and cleaning of the text corpuses, to obtain the Chinese dialog corpus dataset.

In some embodiments, the performing sentence breaking, word separation, and lexical annotation of dialogs by the public natural language processing toolkit HanLP, and extracting noun words by the regular expression further includes: performing sentence breaking of each dialog in the Chinese dialog corpus dataset by the public natural language processing toolkit HanLP, to obtain m sentences $\{S_1, S_2, S_3, \ldots, S_m\}$, performing word separation of each sentence to obtain n words $\{t_1, t_2, t_3, \ldots, t_n\}$, performing lexical classification of each word $t_x(1 \leq x \leq n)$ according to a processing specification of a modern Chinese corpus set, giving each word a lexical marker by lexical classification according to components that words assume in a syntactic structure or a language morphology, and extracting all words that meet a noun by the regular expression, the noun by the regular expression including adjectives with nouns, nouns, personal names, place names, institutional group names, and proper nouns from lexical categories.

In some embodiments, the performing enhancement of semantic and thematic information on each sentence, and learning vector representations of original sentences and the enhanced sentences by the pre-trained sentence representation model further includes:
  performing enhancement of semantic data on each sentence $S_y(1 \leq y \leq m)$;
  performing enhancement of thematic information on the extracted words that meet the noun;
  performing another data enhancement on an enhanced dialog text; and
  learning vector representations of the original sentences and the enhanced sentences by the pre-trained sentence representation model RoBERTa.

In some embodiments, manners of the enhancement of semantic data include:
  1) replacing phrases in a dialog text with random synonyms by a Chinese near-synonym dictionary;
  2) randomly swapping positions of neighboring phrases in the dialog text;
  3) random repeating non-noun phrases in the dialog text multiple times or delete the same; or 4) rewriting the dialog text by a SimBERT model; and
manners of the enhancement of thematic information include:
  1) obtaining similar words of nouns or noun phrases by a large-scale word vector model, and replacing nouns or noun phrases in an original dialog text with the similar words; or
  2) random repeating noun phrases or short phrases in the dialog text multiple times.

In some embodiments, the extracting semantic and thematic information of dialog sentences by the graph convolutional neural network, and performing thematic aggregation enhancement to obtain the sentence vector after the thematic aggregation enhancement further includes:
  constructing a directed graph with an original dialog text and an enhanced dialog text, a node denoted as $v_o$ on the graph representing original sentences after encoding, a node denoted as $v_A$ representing a set of the enhanced sentences, and each enhanced sentence having an edge denoted as $\varepsilon$ pointing to the original sentence, to define the directed graph denoted as $G=(v, \varepsilon)$ finally; and
  after constructing the directed graph G, performing semantic and thematic aggregation enhancement on the original sentences along a direction of the edge denoted as $\varepsilon$ by the graph convolutional neural network.

A manner of the aggregation enhancement includes:
  two types of relationships existing in the directed graph G:
  a first-order direct adjacency matrix denoted as $$A_{D(v_i,v_j)} = \begin{cases} 0 & \text{if } (v_i \in v_A, v_j \in v_A) \\ 1 & \text{if } (v_i = v_o, v_j \in v_A) \end{cases}$$

representing that two nodes are connected by an edge, referring to the original sentence and the enhanced sentence which are adjacent directly;
  a second-order direct adjacency matrix denoted as $$A_{ID(v_i,v_j)} = \begin{cases} 1 & \text{if } (v_i \in v_A, v_j \in v_A) \\ 0 & \text{if } (v_i = v_o, v_j \in v_A) \end{cases}$$

representing that two nodes are not directly connected by an edge, but have a common neighboring node;
  calculating degree matrices corresponding to the adjacency matrix $A_{D(v_i,v_j)}$ and the adjacency matrix $A_{ID(v_i,v_j)}$ by formulas $$D = \sum_j A_{D(v_i,v_j)} \text{ and } D' = \sum_j A_{ID(v_i,v_j)};$$

normalizing the adjacent matrix $A_{D(v_i,v_j)}$ and the adjacency matrix $A_{ID(v_i,v_j)}$ by corresponding degree matrices, respectively, by formulas $$N = D^{-\frac{1}{2}} A_{D(v_i,v_j)} D^{-\frac{1}{2}}$$

and $$N' = D'^{-\frac{1}{2}} A_{ID(v_i,v_j)} D'^{-\frac{1}{2}};$$

and
  calculating each sentence vector denoted as $H_{l+1}$ after the enhancement of first-order adjacency and second-order adjacency by a linear variation and a Sigmoid activation function, referring to a formula $$H_{l+1} = \sigma(W(\alpha N + \beta N')H_l + b),$$

$$\sigma(x) = \frac{1}{1+e^{-x}}.$$

$H_l$ represents an original sentence vector before the thematic enhancement, W and b represent weights of the linear variation, and $\alpha$ and $\beta$ represent learnable parameters.

In some embodiments, the inputting the sentence vector after the thematic aggregation enhancement into the pre-trained generative model GPT, generating the candidate set of dialog replies by the decoding strategy of beam search, and finally training the reply ranking selection model with the contrast learning manner to select the most suitable reply further includes:
  splicing the sentence vector after the thematic aggregation enhancement with the original sentence vector, and inputting a spliced sentence vector into the pre-trained generative model GPT, and generating the candidate set of dialog replies by Bean Search in a decoding process; and
  training the reply ranking selection model with the contrast learning manner to obtain the most suitable reply of the original sentence.

In some embodiments, the training the reply ranking selection model with the contrast learning manner to obtain the most suitable reply of the original sentence further includes: constructing positive/negative examples from the text corpuses of Chinese open domain dialog collected by means of a web crawler, taking a preceding text and a following text of the same dialog as a positive example, taking the preceding text of the dialog and a reply of other dialogs as a negative example, and training the reply ranking selection model with the positive/negative examples to determine whether the reply is suitable, which further includes:
  splicing the preceding text and the following text together, splicing the preceding text and the reply together, inputting spliced texts into a pre-trained BERT model, and taking a vector denoted as $S_i$ corresponding to a parameter denoted as [CLS] token of an output of the BERT model to perform a classification.

In some embodiments, a loss function of training the reply ranking selection model is as follows:

$$loss_i = -\log \frac{e^{sim(S_i^1, S_i^2)/\tau}}{\sum_{j=1}^{N} e^{sim(S_i^1, S_j^2)/\tau}}$$

$S_i^1$ represents a preceding sentence of a dialog i, $S_i^2$ represents a following sentence that replies to the sentence $S_i^1$ in the dialog i, $S_j^2$ represents a following sentence in other dialogs, i.e., a dialog j, N represents the number of other dialogs.

An open domain dialog reply system based on thematic enhancement includes a text collection module, a word division and lexical annotation module, a semantic and thematic enhancement module, a text encoding module, a sentence ranking module based on contract learning, and a reply generation module.

The text collection module is configured for collecting text corpuses of Chinese open domain dialog which are open-source by means of a web crawler, and performing data filtering and cleaning of the text corpuses.

The word division and lexical annotation module is configured to break sentences and divide words, give each word a lexical marker by lexical classification according to components that each word or phrase assumes in a syntactic structure or a language morphology, and extract words with a noun property by a regular expression.

The semantic and thematic enhancement module is configured for performing enhancement of semantic and thematic information on original sentences to enable a model to better learn semantic representation of sentences, including: 1) random synonym replacement, 2) random neighboring word swapping, 3) random deletion or repetition of non-noun phrases, 4) sentence rewriting with a SimBERT model, 5) synonym replacement of nouns with a word vector model, or 6) random repetition of noun phrases.

The text encoding module is configured to obtain a vector representation between the original sentences and enhanced sentences by a pre-trained sentence representation model, and perform aggregation of sentence vector representations after enhancement with a graph convolutional neural network to obtain a sentence vector representation after thematic enhancement.

The sentence ranking module based on contract learning is configured to take a preceding text and a following text of the same dialog as a positive example, take the preceding text of the dialog and a reply of other dialogs as a negative example, and train a reply ranking selection model with a contrast learning manner to select the most suitable reply.

The reply generation module is configured to input the sentence vector representation after thematic enhancement, which is obtained by the graph convolutional neural network, as a prompt into a pre-trained generative model GPT, generate a candidate set of thematic-related replies by means of Beam Search, and rank and select the most suitable reply by a previously trained sentence ranking module based on contract learning.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

To describe and illustrate embodiments and/or examples of the present disclosure made public here better, reference may be made to one or more of the figures. The additional details or embodiments used to describe the figures should not be construed as limiting the scope of any of the present disclosure, the embodiments and/or examples currently described, and the best model of the present disclosure as currently understood.

DETAILED DESCRIPTION

To make purposes, technical solutions and advantages of the present disclosure clearer, the present disclosure is described and explained below with reference to the accompanying drawings and embodiments of the present disclosure. It should be understood that the specific embodiments described herein are only used to interpret the present disclosure and are not intended to limit the present disclosure. Based on the embodiments provided in the present disclosure, all other embodiments obtained by those of ordinary skill in the art without performing creative work fall within the scope of the present disclosure. Furthermore, it is also understood that although the efforts made in development process may be complex and lengthy, for ordinary persons skilled in the art related to the content disclosed in the present disclosure, some design, manufacturing or production variations based on the technical content disclosed in the present disclosure are only conventional technical means, and should not be understood as insufficient content disclosed in the present disclosure.

References to "embodiment" in the present application means that a particular feature, structure or property described in conjunction with the embodiment may be included in at least one embodiment of the present application. The occurrence of the phrase in various positions of the description does not necessarily refer to the same embodiment, nor is it a separate or alternative embodiment that is mutually exclusive with other embodiments. Those of ordinary skill in the art expressly and implicitly understand that the embodiments described in the present application may be combined with other embodiments without conflict.

Unless otherwise defined, all technical and scientific terms used herein have the same meaning as a skilled person in the art would understand. The term "one", "a", "an", "the" and other similar words as used in the present disclosure do not indicate quantitative limitations, and they can be singular or plural. The term "plurality" in the present disclosure refers to two or more. The terms "include", "comprise", "have", and any variation thereof, as used in the present disclosure, are intended to cover a non-exclusive inclusion.

Figure 1:
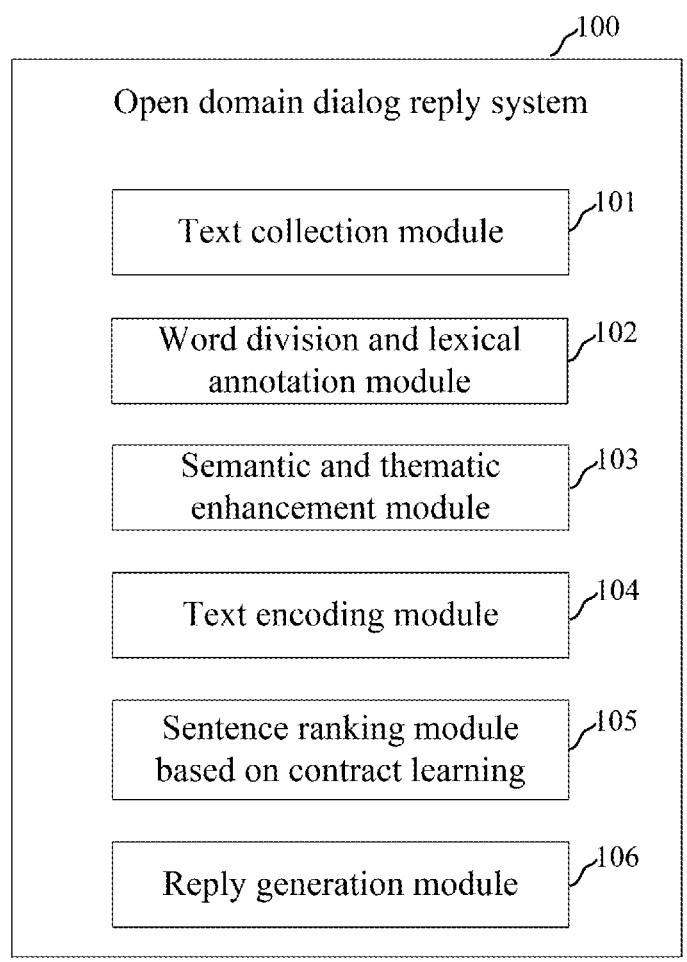
FIG. 1 is a block diagram of an open domain dialog reply system based on thematic enhancement in an embodiment of the present disclosure.

Referring to FIG. 1, the present disclosure provides an open domain dialog reply system 100 based on thematic enhancement, and the system includes a text collection module 101, a word division and lexical annotation module 102, a semantic and thematic enhancement module 103, a text encoding module 104, a sentence ranking module based on contract learning 105, and a reply generation module 106.

The text collection module 101 is configured for collecting text corpuses of Chinese open domain dialog which are open-source by means of a web crawler, and performing data filtering and cleaning of the text corpuses.

The word division and lexical annotation module 102 is configured to break sentences and divide words, give each word a lexical marker by lexical classification according to components that each word or phrase assumes in a syntactic structure or a language morphology, and extract words with a noun property by a regular expression.

The semantic and thematic enhancement module 103 is configured for performing enhancement of semantic and thematic information on original sentences to enable a model to better learn semantic representation of sentences, including: 1) random synonym replacement, 2) random neighboring word swapping, 3) random deletion or repetition of non-noun phrases, 4) sentence rewriting with a SimBERT model, 5) synonym replacement of nouns with a word vector model, or 6) random repetition of noun phrases.

The text encoding module 104 is configured to obtain a vector representation between the original sentences and enhanced sentences by a pre-trained sentence representation model, and perform aggregation of sentence vector representations after enhancement with a graph convolutional neural network to obtain a sentence vector representation after thematic enhancement.

The sentence ranking module based on contract learning 105 is configured to take a preceding text and a following text of the same dialog as a positive example, take the preceding text of the dialog and a reply of other dialogs as a negative example, and train a reply ranking selection model with a contrast learning manner to select the most suitable reply.

The reply generation module 106 is configured to input the sentence vector representation after thematic enhancement, which is obtained by the graph convolutional neural network, as a prompt into a pre-trained generative model GPT, generate a candidate set of thematic-related replies by means of Beam Search, and rank and select the most suitable reply by a previously trained sentence ranking module based on contract learning 105.

The present embodiment provides the open domain dialog reply system 100 based on contract learning, the graph convolutional neural network, and thematic enhancement. By performing enhancement of semantic and thematic information on original sentences, and performing aggregation of sentence vector representations after enhancement with a graph convolutional neural network, a candidate set of replies with theme consistency can be generated. Moreover, the reply ranking selection model can be optimized with a contrast learning manner, so as to ensure the generation of the reply with both theme consistency and semantic fluency.

Figure 2:
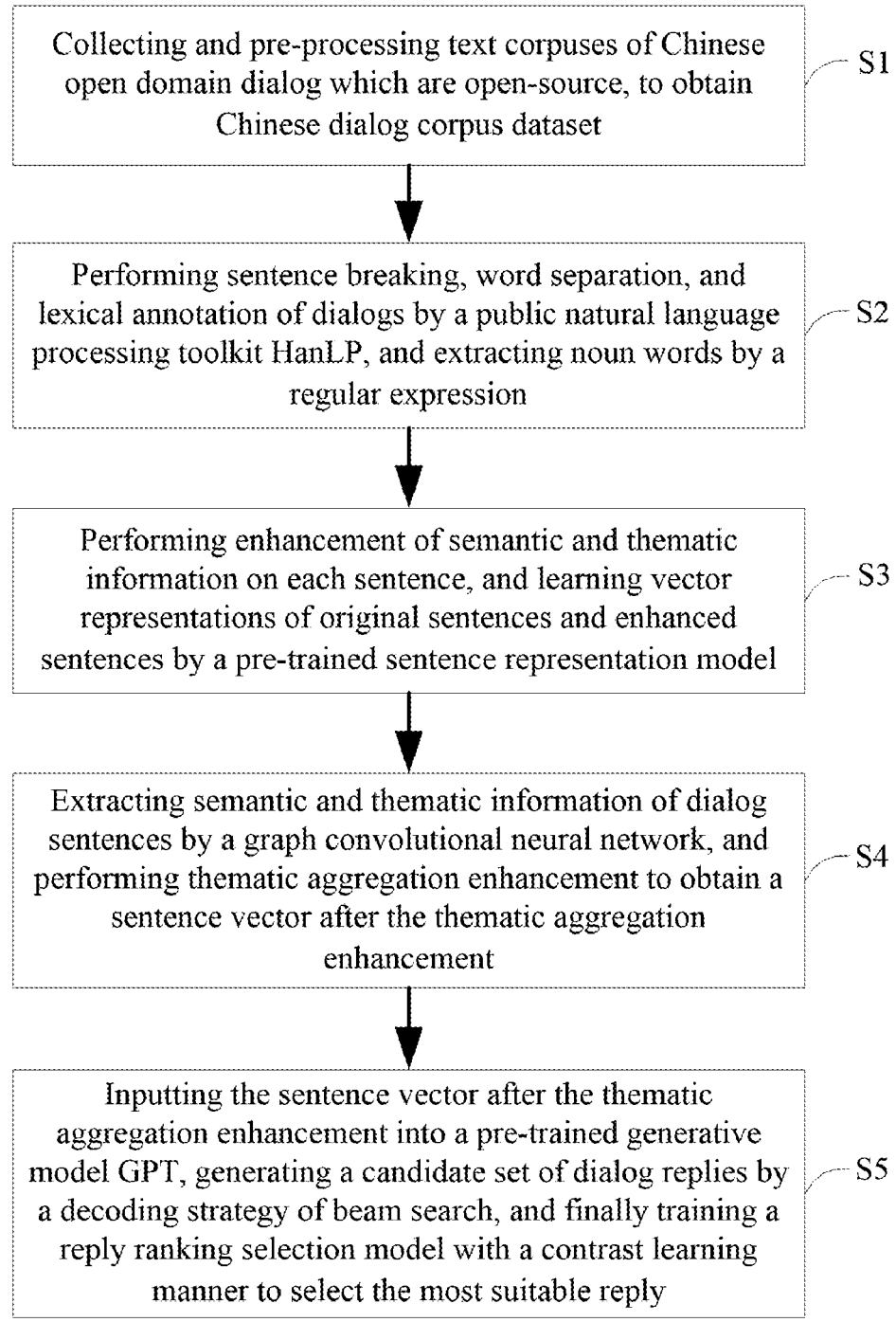
FIG. 2 is a flowchart diagram of an open domain dialog reply method based on thematic enhancement in an embodiment of the present disclosure.

Referring to FIG. 2, the present disclosure provides an open domain dialog reply method based on thematic enhancement, and the method includes the following step 1 to step 5.

Step 1 includes collecting and pre-processing text corpuses of Chinese open domain dialog which are open-source, to obtain Chinese dialog corpus dataset.

Furthermore, the step 1 may further include collecting the text corpuses of Chinese open domain dialog by means of a web crawler and performing data filtering and cleaning of the text corpuses, to obtain nearly 3 million dialog data. The text corpuses may include a microblog corpus, a Douban dialog corpus, and a Baidu posting dialog corpus.

Step 2 includes performing sentence breaking, word separation, and lexical annotation of dialogs by a public natural language processing toolkit HanLP, and extracting noun words by a regular expression.

Furthermore, the step 2 may further include performing sentence breaking of each dialog by a suite of word separation and lexical annotation provided by the public natural language processing toolkit HanLP, to obtain m sentences $\{S_1, S_2, S_3, \ldots, S_m\}$, performing word separation of each sentence to obtain n words $\{t_1, t_2, t_3, \ldots, t_n\}$, giving a word separation result in the sentence by a machine, and giving each word a lexical marker by lexical classification according to components that words assume in a syntactic structure or a language morphology.

Furthermore, each word $t_x(1 \leq x \leq n)$ may be classified into forty-three lexical categories according to a PKU specification (i.e., a processing specification of a modern Chinese corpus set). In order to find a thematic-related phrase, an (adjectives with nouns), n (nouns), nr (personal names), ns (place names), nt (institutional group names), nz (proper nouns) can be selected from the forty-three lexical categories, and all words that meet the above noun can be extracted by the regular expression.

Step 3 includes performing enhancement of semantic and thematic information on each sentence, and learning vector representations of original sentences and enhanced sentences by a pre-trained sentence representation model, which includes steps 3.1 to step 3.4.

Step 3.1 may include performing enhancement of semantic data on each sentence $S_y(1 \leq y \leq m)$ in order to enable a network model to better learn semantic representation of sentences, including:
1) replacing phrases in a dialog text (i.e., sentences of a dialog) with random synonyms by a Chinese near-synonym dictionary;
2) randomly swapping positions of neighboring phrases in the dialog text;
3) random repeating non-noun phrases in the dialog text multiple times or delete the same; or
4) rewriting the dialog text by a SimBERT model.

Step 3.2 may include if the sentences of the dialog include a noun or a noun phrase extracted by a lexical marker model, in addition to enhance the semantic of the sentences at the step 3.1, further performing enhancement of thematic information on the noun or the noun phrase, which includes:
1) obtaining similar words of nouns or noun phrases by a large-scale word vector model, and replacing nouns or noun phrases in an original dialog text (i.e., original sentences) with the similar words; or
2) random repeating noun phrases or short phrases in the dialog text multiple times.

Step 3.3 may include after obtaining a dialog text with enhancement of semantic and thematic information, performing another data enhancement on an enhanced dialog text by the step two to step three, so as to ensure richness of semantics and themes of the enhanced dialog text.

Step 3.4 may include learning vector representations of the original sentences and the enhanced sentences by the pre-trained sentence representation model RoBERTa, and inputting a sentence into the model RoBERTa, and taking out a vector corresponding to the [CLS] token in the output as the vector representation of the sentence.

Step 4 includes extracting semantic and thematic information of sentences by a graph convolutional neural network, and performing thematic aggregation enhancement to obtain a sentence vector after the thematic aggregation enhancement, which includes step 4.1 to step 4.2.

Step 4.1 may include constructing a directed graph with an original dialog text and an enhanced dialog text, a node denoted as $v_o$ on the graph representing original sentences after encoding, a node denoted as $v_A$ representing a set of the enhanced sentences, and each enhanced sentence having an edge denoted as $\varepsilon$ pointing to the original sentence, to define the directed graph denoted as $G=(v, \varepsilon)$ finally.

Step 4.2 may include after constructing the directed graph G, performing semantic and thematic aggregation enhancement on the original sentences along a direction of the edge by the graph convolutional neural network. The specific steps are as follows:
two types of relationships existing in the directed graph G:

a first-order direct adjacency matrix denoted as $$A_{D(v_i,v_j)} = \begin{cases} 0 & \text{if } (v_i \in v_A, v_j \in v_A) \\ 1 & \text{if } (v_i = v_o, v_j \in v_A) \end{cases}$$

representing that two nodes are connected by an edge, referring to the original sentence and the enhanced sentence which are adjacent directly; a second-order direct adjacency matrix denoted as $$A_{ID(v_i,v_j)} = \begin{cases} 0 & \text{if } (v_i \in v_A, v_j \in v_A) \\ 1 & \text{if } (v_i = v_o, v_j \in v_A) \end{cases}$$

representing that two nodes are not directly connected by an edge, but have a common neighboring node, which means that in a network of the constructed directed graph, two nodes not directly connected in the enhanced sentences can also have connections between certain themes, and more thematic-related features of the dialog text can be extracted by a second-order direct adjacency relationship;

calculating degree matrices corresponding to the adjacency matrix $A_{D(v_i,v_j)}$ and the adjacency matrix $A_{ID(v_i,v_j)}$ by $$D = \sum_j A_{D(v_i,v_j)}$$

and $$D' = \sum_j A_{ID(v_i,v_j)};$$

formulas normalizing the adjacent matrix $A_{D(v_i,v_j)}$ and the adjacency matrix $A_{ID(v_i,v_j)}$ by corresponding degree matrices, respectively, preventing a certain node from causing a great influence on a calculation result due to more connected edges, by formulas $$N = D^{-\frac{1}{2}} A_{D_{(v_i,v_j)}} D^{-\frac{1}{2}}$$

and $$N' = D'^{-\frac{1}{2}} A_{ID_{(v_i,v_j)}} D'^{-\frac{1}{2}};$$

and calculating each sentence vector denoted as $H_{l+1}$ after the enhancement of first-order adjacency and second-order adjacency by a linear variation and a Sigmoid activation function, referring to a formula $$H_{l+1} = \sigma(W(\alpha N + \beta N')H_l + b),$$

$$\sigma(x) = \frac{1}{1+e^{-x}}.$$

$H_l$ represents an original sentence vector before the thematic enhancement, W and b represent weights of the linear variation, and $\alpha$ and $\beta$ represent learnable parameters, which are configured to control influence of the enhanced sentences represented by the first-order direct adjacency matrix and the second-order direct adjacency matrix on the thematic enhancement.

Step 5 includes inputting the sentence vector after the thematic aggregation enhancement into a pre-trained generative model GPT, generating a candidate set of dialog replies by a decoding strategy of beam search, and finally training a reply ranking selection model with a contrast learning manner to select the most suitable reply, which includes step 5.1 and step 5.2.

Step 5.1 may include splicing the sentence vector as a prompt of a theme after the thematic aggregation enhancement with the original sentence vector, and inputting a spliced sentence vector into the pre-trained generative model GPT, and generating the candidate set of dialog replies by Bean Search in a decoding process. Different from Greedy Search, in which only a feature vector token with the highest probability can be generated in each time step, candidate feature vectors tokens in the number of beam size with the highest probability can be generated in each time step when replies are generated by the Beam search.

Step 5.2 may include after generating the candidate set of dialog replies by the Bean Search, training the reply ranking selection model with the contrast learning manner to obtain the most suitable reply of the original sentence.

The training the reply ranking selection model with the contrast learning manner to obtain the most suitable reply of the original sentence may further include: constructing positive/negative examples from the text corpuses of Chinese open domain dialog collected by means of a web crawler, taking a preceding text and a following text of the same dialog as a positive example, taking the preceding text of the dialog and a reply of other dialogs as a negative example, and training the reply ranking selection model with the positive/negative examples to determine whether the reply is suitable, which may further include: splicing the preceding text and the following text together, splicing the preceding text and the reply together, inputting spliced texts into a pre-trained BERT model, and taking a vector denoted as $S_i$ corresponding to a parameter denoted as [CLS] token of an output of the BERT model to perform a classification. A loss function of training the reply ranking selection model may be as follows:

$$loss_i = -\log \frac{e^{sim(S_i^1, S_i^2)/\tau}}{\sum_{j=1}^{N} e^{sim(S_i^1, S_j^2)/\tau}}$$

$S_i^1$ represents a preceding sentence of a dialog i, $S_i^2$ represents a following sentence that replies to the sentence $S_i^1$ in the dialog i, $S_j^2$ represents a following sentence that in other dialogs, i.e., a dialog j, N represents the number of other dialogs.

The contrast learning manner is to ensure that a distance between the positive examples decreases, while a distance between negative examples increases.

In conclusion, the method provided in this embodiment enables controllable generation of the thematic-related replies in an open domain by the graph convolutional neural network, the contrast learning manner and the thematic enhancement.

In the open domain dialog reply method of the present disclosure, the data enhancement can be applied to enhancing semantic and thematic information of the sentences in a limited dialog corpus by the lexical annotation and a large-scale word vector model. The graph convolutional neural network can be applied to fusion and enhancement of the themes on the original sentences by performing enhancement of semantic and thematic information. Constructing positive/negative examples can be applied on the contrast learning manner to close a distance of a related reply during a model learning process, so as to select a suitable reply from the generated candidate set of dialog replies by the model. The present disclosure can solve problems of general replies, lack of theme consistency and the like in the generation of open domain dialog reply, and improve effect of generation of open domain dialog replies.

Corresponding to the open domain dialog reply method based on thematic enhancement in the aforementioned embodiment, the present disclosure further provides an open domain dialog reply device based on thematic enhancement.

Figure 3:
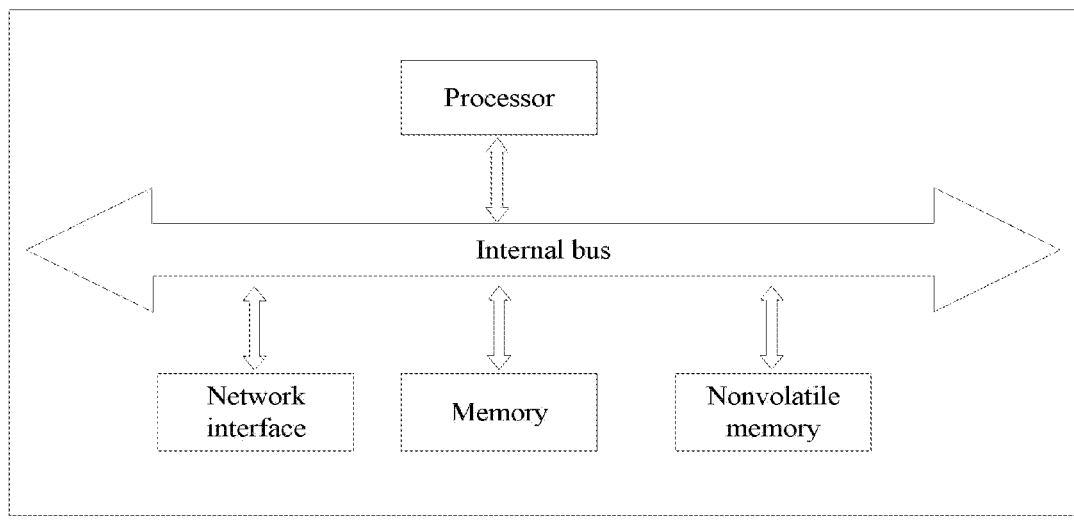
FIG. 3 is a structural schematic diagram of an open domain dialog reply device based on thematic enhancement in an embodiment of the present disclosure.

Referring to FIG. 3, in the present embodiment, the open domain dialog reply device based on thematic enhancement includes one or more processors, and the processor is configured to implement any of the open domain dialog reply methods based on thematic enhancement in the above embodiments.

The open domain dialog reply device based on thematic enhancement in the present disclosure may be applied to any device with data processing capabilities, and the device may be a device or an apparatus such as a computer. The device in an embodiment may be implemented by software, or by hardware or a combination of software and hardware. Taking software implementation as an example, the open domain dialog reply device, as a device in a logical sense, is formed by reading corresponding computer program instructions in a nonvolatile memory to a memory by a processor of any device with data processing capabilities. For hardware implementation, FIG. 3 is a structural schematic diagram of an open domain dialog reply device based on thematic enhancement in any device with data processing capabilities. The any device with data processing capabilities includes the open domain dialog reply device based on thematic enhancement in this embodiment. In addition to the processor, the memory, a network interface, and the nonvolatile memory shown in FIG. 3, the any device with data processing capabilities may also include other hardware based on the actual function of the device with data processing capabilities, which will not be described herein.

An implementation process of the functions and roles of each unit in the above device is specifically detailed in an implementation process of the corresponding steps in the above method, which will not be described herein.

For the device in some embodiments, since it basically corresponds to the method in the above embodiment, reference can be made to the description of the method. The device described above are merely illustrative, and the unit described as a separate component may or may not be physically separated. The component displayed as a unit may or may not be a physical unit, that is, the component may be located in one place, or may also be distributed on a plurality of network units. Some or all of the units can be selected according to actual needs to achieve the solutions of the present disclosure. Those of ordinary skill in the art can understand and implement the present disclosure without creative work.

The present disclosure further provides a computer-readable storage medium. The computer-readable storage medium can store computer program instructions, and the computer program instructions can be executed by the processor to implement any of the open domain dialog reply methods based on thematic enhancement in the above embodiments.

The computer-readable storage medium may be an internal storage unit of the device with data processing capabilities described in any of the above embodiments, such as a hard disk or memory. The computer-readable storage medium may also be an external storage device, such as a pluggable hard disk, Smart Media Card (SMC), SD card, Flash Card and the like in the device. Furthermore, the computer-readable storage medium may further include both the internal storage unit of any device with data processing capabilities and the external storage device. The computer-readable storage medium is configured to store the computer program and other programs and data required by any device with data processing capabilities, and may also be configured to temporarily store data that has been output or will be output.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An open domain dialog reply method based on thematic enhancement, comprising:
    collecting and pre-processing text corpuses of Chinese open domain dialog which are open-source, to obtain Chinese dialog corpus dataset;
    performing sentence breaking, word separation, and lexical annotation of dialogs by a public natural language processing toolkit HanLP (Han Language Processing), and extracting noun words by a regular expression;
    performing enhancement of semantic and thematic information on each sentence, and learning vector representations of original sentences and enhanced sentences by a pre-trained sentence representation model RoBERTa (Robustly optimized Bidirectional Encoder Representations from Transformers approach);
    extracting semantic and thematic information of sentences by a graph convolutional neural network, and performing thematic aggregation enhancement to obtain a sentence vector after the thematic aggregation enhancement; and
    inputting the sentence vector after the thematic aggregation enhancement into a generative pre-trained model GPT (Generative Pre-Trained Transformer), generating a candidate set of dialog replies by a decoding strategy of beam search, and finally training a reply ranking selection model with a contrast learning manner to select the most suitable reply;
    wherein the performing sentence breaking, word separation, and lexical annotation of dialogs by the public natural language processing toolkit, and extracting noun words by the regular expression further comprises:

performing sentence breaking of each dialog in the Chinese dialog corpus dataset by the public natural language processing toolkit HanLP, to obtain m sentences $\{S_1, S_2, S_3, \ldots, S_m\}$, performing word separation of each sentence to obtain n words $\{t_1, t_2, t_3, \ldots, t_n\}$, performing lexical classification of each word $t_x$ ($1 \leq x \leq n$) according to a processing specification of a modern Chinese corpus set, giving each word a lexical marker by lexical classification according to components that words assume in a syntactic structure or a language morphology, and extracting all words that meet a noun by the regular expression, the noun by the regular expression including adjectives with nouns, nouns, personal names, place names, institutional group names, and proper nouns from lexical categories; and the performing enhancement of semantic and thematic information on each sentence, and learning vector representations of original sentences and the enhanced sentences by the pre-trained sentence representation model further comprises:

performing enhancement of semantic data on each sentence $S_y$ ($1 \leq y \leq m$);

performing enhancement of thematic information on the extracted words that meet the noun;

performing another data enhancement on an enhanced dialog text; and learning vector representations of the original sentences and the enhanced sentences by the pre-trained sentence representation model.

2. The open domain dialog reply method based on thematic enhancement of claim 1, wherein the collecting and pre-processing text corpuses of Chinese open domain dialog which is open-source, to obtain Chinese dialog corpus dataset further comprises:

collecting the text corpuses of Chinese open domain dialog which are open-source by means of a web crawler, and performing data filtering and cleaning of the text corpuses, to obtain the Chinese dialog corpus dataset.

3. The open domain dialog reply method based on thematic enhancement of claim 1, wherein manners of the enhancement of semantic data comprise:

1) Replacing phrases in a dialog text with random synonyms by a Chinese near-synonym dictionary;
2) Randomly swapping positions of neighboring phrases in the dialog text;
3) random repeating non-noun phrases in the dialog text multiple times or delete the same; or
4) rewriting the dialog text by a SimBERT (Bidirectional Encoder Representations from Transformers) model; and manners of the enhancement of thematic information comprise:

1) Obtaining similar words of nouns or noun phrases by a large-scale word vector model, and replacing nouns or noun phrases in an original dialog text with the similar words; or
2) Random repeating noun phrases or short phrases in the dialog text multiple times.

4. The open domain dialog reply method based on thematic enhancement of claim 1, wherein the extracting semantic and thematic information of dialog sentences by the graph convolutional neural network, and performing thematic aggregation enhancement to obtain the sentence vector after the thematic aggregation enhancement further comprises:

constructing a directed graph with an original dialog text and an enhanced dialog text, a node denoted as $v_o$ on the graph representing original sentences after encoding, a node denoted as $v_A$ representing a set of the enhanced sentences, and each enhanced sentence having an edge denoted as e pointing to the original sentence, to define the directed graph denoted as $G=(v, \varepsilon)$ finally; and after constructing the directed graph G, performing semantic and thematic aggregation enhancement on the original sentences along a direction of the edge by the graph convolutional neural network;

wherein a manner of the aggregation enhancement comprises:

two types of relationships existing in the directed graph G:

a first-order direct adjacency matrix denoted as $$A_{D(v_i,v_j)} = \begin{cases} 0 & \text{if } (v_i \in v_A, v_j \in v_A) \\ 1 & \text{if } (v_i = v_o, v_j \in v_A) \end{cases}$$

representing that two nodes are connected by an edge, referring to the original sentence and the enhanced sentence which are adjacent directly;

a second-order direct adjacency matrix denoted as $$A_{ID(v_i,v_j)} = \begin{cases} 1 & \text{if } (v_i \in v_A, v_j \in v_A) \\ 0 & \text{if } (v_i = v_o, v_j \in v_A) \end{cases}$$

representing that two nodes are not directly connected by an edge, but have a common neighboring node;

calculating degree matrices corresponding to the adjacency matrix $A_{D(v_i,v_j)}$ and the adjacency matrix $A_{ID(v_i,v_j)}$ by formulas $$D = \sum_j A_{D(v_i,v_j)}$$

and $$D' = \sum_j A_{ID(v_i,v_j)};$$

normalizing the adjacent matrix $A_{D(v_i,v_j)}$ and the adjacency matrix $A_{ID(v_i,v_j)}$ by corresponding degree matrices, respectively, by formulas $$N = D^{-\frac{1}{2}} A_{D_{(v_i,v_j)}} D^{-\frac{1}{2}}$$

and $$N' = D'^{-\frac{1}{2}} A_{ID_{(v_i,v_j)}} D'^{-\frac{1}{2}};$$

and calculating each sentence vector denoted as $H_{l+1}$ after the enhancement of first-order adjacency and second-order adjacency by a linear variation and a Sigmoid activation function, referring to a formula $$H_{l+1} = \sigma(W(\alpha N + \beta N')H_l + b),$$

$$\sigma(x) = \frac{1}{1+e^{-x}};$$

wherein $H_l$ represents an original sentence vector before the thematic enhancement, W and b represent weights of the linear variation, and $\alpha$ and $\beta$ represent learnable parameters.

5. The open domain dialog reply method based on thematic enhancement of claim 4, wherein the inputting the sentence vector after the thematic aggregation enhancement into the generative pre-trained model GPT, generating the candidate set of dialog replies by the decoding strategy of beam search, and finally training the reply ranking selection model with the contrast learning manner to select the most suitable reply further comprises:

splicing the sentence vector after the thematic aggregation enhancement with the original sentence vector, and inputting a spliced sentence vector into the generative pre-trained model GPT, and generating the candidate set of dialog replies by Bean Search in a decoding process; and training the reply ranking selection model with the contrast learning manner to obtain the most suitable reply of the original sentence.

6. The open domain dialog reply method based on thematic enhancement of claim 5, wherein the training the reply ranking selection model with the contrast learning manner to obtain the most suitable reply of the original sentence further comprises:

constructing positive/negative examples from the text corpuses of Chinese open domain dialog collected by means of a web crawler, taking a preceding text and a following text of the same dialog as a positive example, taking the preceding text of the dialog and a reply of other dialogs as a negative example, and training the reply ranking selection model with the positive/negative examples to determine whether the reply is suitable, which further comprises:

splicing the preceding text and the following text together, splicing the preceding text and the reply together, inputting spliced texts into a pre-trained BERT (Bidirectional Encoder Representations from Transformers) model, and taking a vector denoted as $S_i$ corresponding to a parameter denoted as [CLS] token of an output of the BERT model to perform a classification.

7. The open domain dialog reply method based on thematic enhancement of claim 6, wherein a loss function of training the reply ranking selection model is as follows:

$$loss_i = -\log \frac{e^{sim(S_i^1, S_i^2)/\tau}}{\sum_{j=1}^{N} e^{sim(S_i^1, S_j^2)/\tau}}$$

wherein $S_i^1$ represents a preceding sentence of a dialog i, $S_i^2$ represents a following sentence that replies to the sentence $S_i^1$ in the dialog i, $S_j^2$ represents a following sentence in other dialogs, i.e., a dialog j, N represents the number of other dialogs.

8. An open domain dialog reply system based on thematic enhancement, comprising a text collection module, a word division and lexical annotation module, a semantic and thematic enhancement module, a text encoding module, a sentence ranking module based on contract learning, and a reply generation module;

wherein the text collection module is configured for collecting text corpuses of Chinese open domain dialog which are open-source by means of a web crawler, and performing data filtering and cleaning of the text corpuses;

the word division and lexical annotation module is configured to break sentences and divide words, give each word a lexical marker by lexical classification according to components that each word or phrase assumes in a syntactic structure or a language morphology, and extract words with a noun property by a regular expression;

the semantic and thematic enhancement module is configured for performing enhancement of semantic and thematic information on original sentences to enable a model to better learn semantic representation of sentences, comprising: 1) random synonym replacement, 2) random neighboring word swapping, 3) random deletion or repetition of non-noun phrases, 4) sentence rewriting with a SimBERT model, 5) synonym replacement of nouns with a word vector model, or 6) random repetition of noun phrases;

the text encoding module is configured to obtain a vector representation between the original sentences and enhanced sentences by a pre-trained sentence representation model, and perform aggregation of sentence vector representations after enhancement with a graph convolutional neural network to obtain a sentence vector representation after thematic enhancement;

the sentence ranking module based on contract learning is configured to take a preceding text and a following text of the same dialog as a positive example, take the preceding text of the dialog and a reply of other dialogs as a negative example, and train a reply ranking selection model with a contrast learning manner to select the most suitable reply; and the reply generation module is configured to input the sentence vector representation after thematic enhancement, which is obtained by the graph convolutional neural network, as a prompt into a generative pre-trained model GPT (Generative Pre-Trained Transformer), generate a candidate set of thematic-related replies by means of Beam Search, and rank and select the most suitable reply by a previously trained sentence ranking module based on contract learning.

* * * * *